United States Patent

[11] 3,589,773

[72] Inventor Rod P. Dixon
  Salt Lake City, Utah
[21] Appl. No. 734,661
[22] Filed June 5, 1968
[45] Patented June 29, 1971
[73] Assignee American Oil Shale Corporation
  Salt Lake City, Utah
  Continuation-in-part of application Ser. No. 615,444, Feb. 13, 1967, and a continuation-in-part of Ser. No. 681,146, Nov. 7, 1967.

[54] MANAGEMENT OF UNDERGROUND WATER PROBLEMS
  17 Claims, 4 Drawing Figs.
[52] U.S. Cl. .................................................. 299/4,
  166/247, 61/.5, 61/11
[51] Int. Cl. .................................................. E21b 42/28,
  E02b 11/00
[50] Field of Search ......................................... 299/2, 4, 5,
  13; 166/247; 61/.5, 10, 11

[56] References Cited
  FOREIGN PATENTS
  776,485  1/1968  Canada .................... 166/247
  OTHER REFERENCES
  Tel- 857, U.S. DEPT. OF THE INTERIOR POTENTIAL APPLICATIONS OF NUCLEAR EXPLOSIVES IN DEVELOPMENT AND MANAGEMENT OF WATER RESOURCES. By Arthur M. Piper & Frank W. Stead March 1965 pages 52— 73 inc.

Primary Examiner—Ernest R. Purser
Attorney—Burns, Doane, Swecker & Mathis

ABSTRACT: The detonation of a large size nuclear device in a geological formation is used to prevent or minimize flooding of working areas such as conventional mines or nuclearly created chimneys of broken rock from which valuable minerals are to be recovered.

For instance, the preliminary detonation of a large size nuclear device underneath a subterranean aquifer upstream from a mineral zone which is to be mined in a conventional manner or processed after shattering by nuclear detonation will create an underground water storage reservoir into which the aquifer can drain. This prevents such aquifer from being tapped and drained into the mine or nuclearly detonated chimney which contains the mineral being exploited. The mineral zone when shattered downstream by a nuclear detonation can then be exploited in place by retorting or other treatment, eventually allowing the water to drain into the retorted cavity created by the second detonation, and by progressively setting of further shattering detonations downstream from such a previously created underground reservoir and repeating whatever treatment may be appropriate. By storing the water in the upstream nuclear cavity during burning or other treatment operation it is conserved for any further use that may be desired when the retorting or treating phase is finished. In the case of a mineral such as shale, the nahcolite, dawsonite, and other minerals which are present therein are made soluble by the retorting operation and can then be dissolved from the remaining mineral residue when the water level in the treated chimney is raised. In a mineral formation such as natural gas or oil where there is an impermeable capping on top of the production zone with a contained water zone thereabove, the nuclear device is placed at a point such that the lower part of the chimney created by the nuclear detonation is much below the production zone. This permits any water tapped in from above to drain into the lower part of the chimney without interfering with normal gas or oil production.

PATENTED JUN29 1971 3,589,773
FIG.1
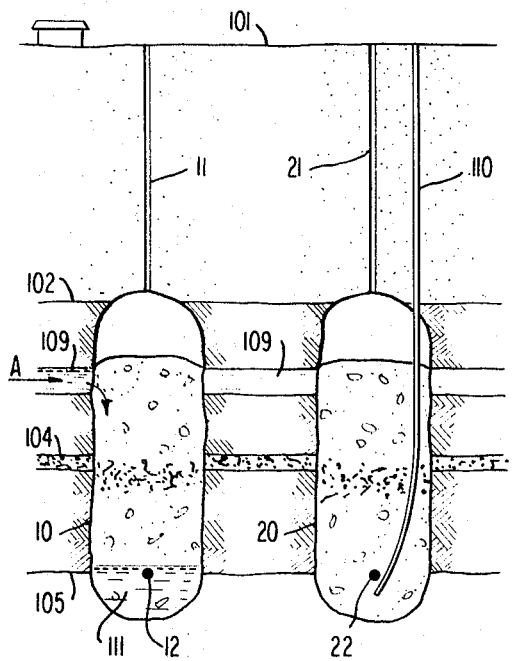
FIG.3
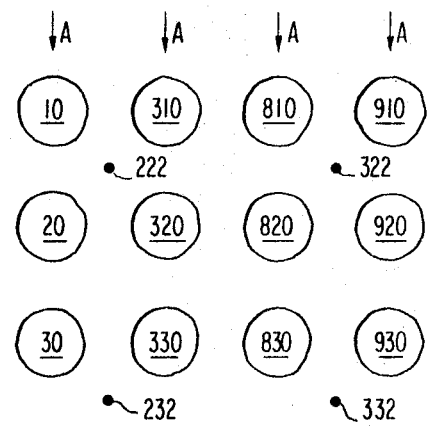
FIG.2
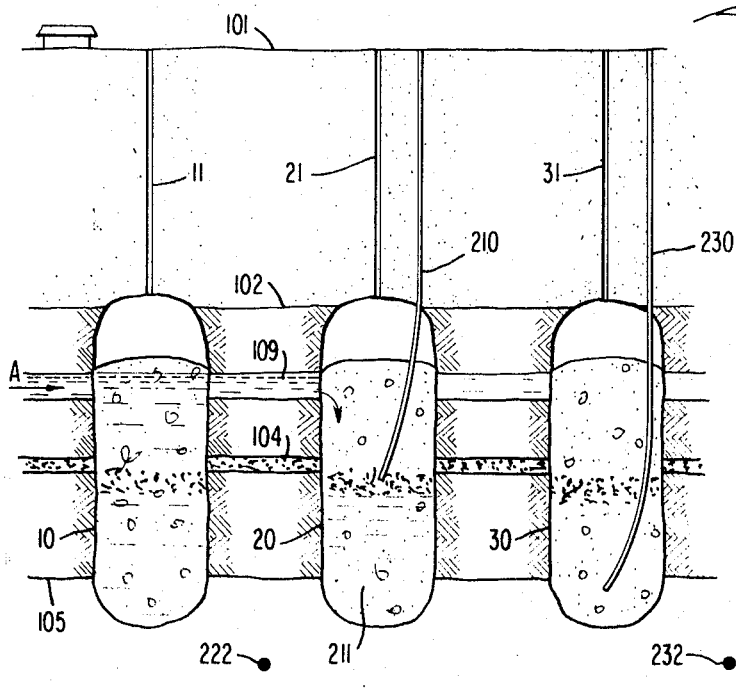
FIG.4
INVENTOR.
ROD P. DIXON
BY
Burns, Doane, Benedict, Swecker & Mathis
ATTORNEYS

MANAGEMENT OF UNDERGROUND WATER PROBLEMS

CROSS-REFERENCE TO RELATED APPLICATIONS

This application is a continuation-in-part of copending applications Ser. No. 615,444, filed Feb. 13, 1967 and Ser. No. 681,146, filed Nov. 7, 1967.

BACKGROUND OF THE INVENTION

It has been well known for several years now that an underground detonation of a nuclear device creates a chimney filled with broken rock, usually with a cavity on top. The mechanism by which this occurs, including the formation of a large hot cavity by vaporization of the rock formation around the point of detonation, expansion of the hot gases and eventual cave-in of the cavity roof, is now also well known and need not be described in detail. Suffice it to say that the resulting chimney or cylinder of rubble which is thus formed contains pieces of broken mineral ranging randomly in size from sand grains to boulders a foot or two in diameter. In typical cases such nuclearly detonated chimneys are characterized by a fairly high degree of permeability, e.g., they may contain in the order of 25 to 40 percent void space by volume. A fracture pattern on the order of a darcy or so is formed in the formation around such chimneys.

In a natural gas formation where there is sufficient pressure and permeability, either of natural origin or artificially created by a nuclear blast or otherwise, the gas will flow at a commercially useful rate. However, where there is a cap rock of impermeable material above the mineral zone, if this is extensively punctured, for instance by a nuclear blast, water present in the cap rock may fill the borehole and shut off the flow. Where the mineral is one which benefits from or requires the application of heat or other treatment with which water interferes, such as steam injection, underground burning, retorting, injection of heated natural gas, hot water, hot brine, or an aqueous solution of an acid or other chemical, certain other problems are encountered.

For instance, where a mineral zone which is to be retorted is traversed by an underground aquifer or where such an aquifer lies above the mineral zone but is tapped by the nuclearly detonated cavity or by a fracture therefrom, the tapped aquifer will pour into the retorting zone and interfere with the retorting operation. If the water falls directly on the burning area it may put it out. Even without this, however, the intrusion of water into the retorting zone will add to the pressure under which the air to support the combustion must be introduced and this will make the operation less economical or impractical. Additionally, water present in any nuclearly detonated area may be contaminated by the radiation of the detonation, with obviously deleterious results.

SUMMARY AND OBJECTS OF THE INVENTION

It is an object of the present invention to employ a special placement of underground nuclear detonations so as to provide improved handling or management of subterranean water in the presence of a desirable mineral deposit which is to be or is being treated to recover mineral values therefrom.

A more specific object of the invention is to employ one or more nuclear detonations so as to divert subterranean water from a zone where it is intended to treat mineral in situ without undue interference from water that may be present in the formation.

Further objects are to reduce or eliminate the need for pumping water from underground mines, to extend the life of such mines by limiting their rate of flooding, and to increase the safety of mines by preventing their sudden flooding.

Another object is to use one or more nuclear detonations to divert a subterranean aquifer in a hydrocarbon-bearing formation such as oil shale at a point upstream from the intended site of in situ retorting of nuclearly detonated shale and to use such aquifer later to leach mineral value from the retorted shale residue.

A further object is to apply a treatment to a mineral formation in situ progressively ahead of a diverted aquifer and thereby avoid impairment of treating efficiency due to water.

Still another object is to create a deep chimney of nuclearly detonated rubble in a formation containing a stratum of fluid hydrocarbons with water thereabove, so that any water tapped can flow to the bottom of the chimney below the hydrocarbon stratum so as to cause minimum interference with the recovery of the hydrocarbons.

These and other objects, as well as the nature, scope and mode of operation of the invention will become more clearly apparent from the following description, particularly when read in conjunction with the accompanying drawing.

THE DRAWING

In the drawing:

FIG. 1 is a vertical section through an oil shale formation through which passes a subterranean aquifer and in which two laterally spaced chimneys substantially filled with broken rock and extending up to the bed of the aquifer have been consecutively created by nuclear detonations;

FIG. 2 is a vertical section through the same formation shown in FIG. 1 but at a later time when the first chimney has become substantially filled with water from the diverted aquifer, the aquifer overflowing from the first chimney has begun to fill the second chimney in which the broken shale has in the meantime been retorted, and a third chimney has been created from which mineral values are to be recovered.

FIG. 3 is a horizontal section through a mineral formation such as that shown in FIG. 1 wherein two rows of four chimneys each have been nuclearly detonated, the first row being across one or more subterranean aquifers upstream relative to the second row and being of such extent that substantially no water will reach the zone containing the second row while the chimneys in the latter are being subjected to a treatment in which the presence of water is undesirable.

FIG. 4 is a vertical section through a mineral formation wherein water is trapped in an upper anticlinal structure while oil or natural gas is trapped in a lower anticlinal structure, a nuclearly detonated chimney having been formed in the formation so as to drain off the water to the bottom and permit the hydrocarbons to rise above the resulting water level.

GENERAL DESCRIPTION

In situ mineral production from an underground deposit has obvious advantages over conventional mining, crushing, milling, and refining. The cost of a shaft or tunnel, the cost of hauling the entire mineral-containing rock to the surface, the cost of hauling the entire mineral-containing rock to the surface, the cost of equipment to crush, mill, and refine makes mineral recovery from most subsurface mineral deposits uneconomical. It has been previously shown that mineral formations can be advantageously broken by nuclear detonation, particularly when a plurality of such detonations is set off in a sequence, and additionally that important advantages can be gained by carrying out various milling and refining steps underground. For instance, consecutive detonations when suitably associated with each other can be used to crush, break, and pressurize a formation, or to increase its permeability, or to make maximum use of the energies released therein by the detonations or by intervening combustive retorting steps or by other auxiliary procedures.

In an oil shale formation in particular, but similarly also in other mineral formations containing a deposit of hydrocarbons, metal ore or other desirable mineral, the mineral broken underground by a nuclear detonation lies in the chimney formed by such detonation in about the same condition as if it had been mined, carried to the surface and put into a retort. In the case of nuclearly detonated oil shale, it is presently considered best to recover oil from it by in situ retorting. As has been heretofore known in the art, this can be done by introducing a combustion-supporting gas such as air from the surface to the top of the broken rubble in the underground chimney and inducing combustion there by an electric spark, for instance. The hydrocarbon in the top portion of the rubble thus starts to burn releasing a hot gas which advances ahead of the burning front and distills out the oil from the broken shale in progressively lower portions thereof. As such retorting proceeds downwardly through the chimney sufficient carbon residue is left behind to support further burning which is maintained by air supplied from the surface, while the shale oil released by the retorting, including condensed oil vapor, flows by gravity to the lower portions of the chimney and is pumped from there through a pipe to the surface. However, when any substantial amount of water is present in such a formation, either as an underground stream or as a trapped pool, such water will create serious problems. It is these problems which the present invention is designed to overcome.

Water always seeks its lowest level as a function of gravity. If the rock or soil which forms the surface of the earth is permeable, water will flow downward from the surface until it reaches an impermeable zone, along which it will flow further downward or above which it will accumulate if its configuration prevents further flow. Rock which has been fractured, or a sand which has spaces between its grains, will permit water to flow laterally on top of an impermeable zone for great distances. As such water flows near or through known mineral zones which are to be treated for recovery, the water can be a serious hindrance. This is particularly so when the mineral recovery procedure involves a heat treatment, as in the case of in situ oil shale retorting. In some locations, the desirable oil shale deposits are up to 2,000 feet thick or thicker and have anywhere from 100 to 1,000 feet or more of rock on top. As the best shale usually lies near the middle depth of a deposit, the flow of an aquifer or water-carrying zone through or near the shale to be nuclearly detonated and retorted in situ represents a major risk or hindrance for such an operation.

The normal method of breaking up a shale zone for in situ retorting is to place a nuclear explosive device at a point under the rich shale zone or in the lower part of the zone in the lean area, such that a chimney or cylinder containing broken shale is created when the device is detonated. Combustion is then induced in such a retortlike chimney and the broken shale is thus retorted and the oil released therefrom is recovered as previously known and described. However, if the fractures from the detonation reach into an aquifer in or near the shale deposit, water flowing from the aquifer into the retorting zone will put out the fire therein or at least impair the efficiency of the retorting step, reducing the temperature therein and building up the pressure because of the stream being generated and, if some of the incoming water remains unvaporized and accumulates, because of the rising water level in the chimney. As a result the required air of combustion must be pumped in from the surface under additional pressure, adding to the cost of the operation.

The present invention avoids or minimizes this problem by blocking or diverting the water from the treating or retorting zone. More particularly, the invention prevents the water from reaching the nuclearly detonated chimney or other working zone by diverting it to a new reservoir purposely formed upstream from such working zone.

More specifically, in practicing the present invention, a hole or nuclear entry means is drilled through or next to the aquifer at a point upstream from the zone to be retorted or otherwise worked. Such a hole is drilled to a depth where the cylinder or chimney of broken rock created by detonation of a nuclear device of appropriate yield will reach into or through the aquifer. The subterranean water stream now has its impermeable lower bed or support stratum broken and made permeable and flows by gravity into the lower portions of the chimney purposely created for this purpose where it will collect as in a reservoir. The normal course of the water flow is thus interrupted and diverted so that it cannot continue to where it otherwise would interfere with the retorting or other beneficial treatment to which the formation is to be subjected. Of course, depending upon the width and flow rate of the aquifer, several chimneys may have to be detonated laterally spaced from each other across its width, and the depth and total volume of the thus created water storage reservoirs must be sufficient to permit diversion of the water thereinto for the entire estimated time it will subsequently take to place, detonate and retort or otherwise treat to the desired extent the downstream area from which the water is to be kept.

Thereafter, when such intentionally created, underground storage reservoirs have been completely filled and the water starts overflowing therefrom into the retorted chimney or chimneys downstream, the latter will serve as additional reservoirs into which water is diverted while the next area still further downstream is blasted and retorted or mined or otherwise worked. Alternatively, if it is desired to keep the water away from a downstream location longer than it takes to fill the previously described chimney or chimneys, additional storage capacity may be obtained by detonating a larger nuclear device at a greater depth next to or between such original chimney or chimneys, causing them to cave down into the new cavity in a manner analogous to that illustrated, for instance, by FIGS. 1 and 2 of my copending application Ser. No. 681,146, filed Nov. 7, 1967. Either way, this process can thus be repeated in a downstream direction along the entire length of an aquifer through the entire oil shale deposit or other mineral bed being exploited.

When the diverted water flowing down through a chimney, which may be either a freshly detonated one or one that has been retorted, passes over rocks or mineral residue containing soluble mineral, such soluble components will be leached out and may be ultimately recovered after the resulting aqueous solution is pumped to the surface. If desired, to increase the solvent power of the water for heavy metal oxides or the like, an acid such as concentrated sulfuric acid may be injected into the aquifer or directly into the chimney to be leached.

As a further feature, when in situ burning is not used but treatment of the mineral formation with steam, or hot water, or hot brine, or other aqueous medium is required, the water collected in the underground chimney described above may be very useful in that a suitably placed later nuclear detonation may be used to heat such accumulated water and convert it into a large quantity of steam or hot or boiling water under pressure.

the invention will next be illustrated in terms of some representative working examples.

EXAMPLE 1

In this illustrative embodiment, described with reference to FIGS. 1, 2 and 3, of the attached drawings the invention is applied to in situ treatment of an oil shale deposit such as the one located in Rio Blanco County, Colorado e.g., Section 24, Township 1 South, Range 98 West. The stratum of pay shale to be treated is about 1,7000 feet thick with about 1,200 feet of lean shale and country rock on top of it. FIG. 1 shows a vertical section through this shale deposit after two columns or chimneys of shale rubble 10 and 20 have been consecutively detonated therein in laterally spaded relationship. The later detonated column 20 is located downstream from column 10 with reference to the aquifer or underground water stream 109 the original course of which is shown to extend substantially horizontally through the shale deposit being treated.

Referring to FIGS. 1 and 2, the earth's surface is designated by numeral 101, the top of the oil shale zone is shown at 102, and the approximate bottom of the pay shale is shown at 105. In addition, the formation, at least at the beginning of the operation contains an aquifer 109 in which water traverses the formation from left to right and further a distinct mineral zone 104 within the main oil shale deposit, such a vein being composed of a soluble mineral such as dawsonite. 11 and 21 are upper portions of entry wells which are drilled down into the formation approximately to a depth corresponding to points 12 and 22 to enable the placement of appropriate nuclear explosive devices at these points.

For instance, 50 kiloton thermonuclear devices may be placed in the formation at locations 12 and 22 at a depth of about 3,100 feet through the access wells which originally extend to this depth, and are sealed off prior to detonation. Of course, the detonation destroys the lower portion of the access wells as the roof of the initial nuclearly created cavity collapses and results in a chimney 10 having a roof approximately 650 feet above the shot point. This chimney has an estimated diameter of about 265 feet and contains about 2 million tons of rubble or crushed rock containing about 20 percent voids. As the chimney 10 is formed and the impermeable bed over which the aquifer 109 flows is fractured, the latter becomes diverted and its water flows down through the chimney 10, accumulating therein, instead of continuing along its original path.

Producing chimney 20 is detonated in substantially the same manner as chimney 10 previously described, but preferably only after the aquifer 109 has been diverted and has begun to accumulate in the upstream reservoir as shown at 111. After such detonation, the desired products are taken from chimney 20 via recovery well 110 in an otherwise known manner. If needed or desired, air for retorting may be introduced into chimney 20 either by redrilling original access well 21 or by a separate new well (not shown), also as otherwise well known. To facilitate the desired draining of the aquifer into the upstream reservoir 10, especially in the early stages of the operation before product removal from the formation via recovery well 110 has begun at a substantial rate, it may be advantageous to redrill access well 11 so as to provide a vent for gases to escape from chimney 10 as water accumulates therein. Of course, if such a vent is provided, it should be carefully constructed with an efficient and mechanically sturdy filter mechanism so as to prevent any radioactive debris from escaping through it when a further nuclear blast is set off in the formation.

When hydrocarbon products have been recovered from chimney 20 to the desired extent, another similar chimney 30 may then be detonated further downstream and the process repeated, at which stage the new chimney will be the active production zone while deep heated or retorted chimney 20 will begin to function as a new reservoir for the subterranean water after reservoir 10 has been filled. Of course, if the water collecting in such subterranean reservoirs leaches out valuable minerals from the formation, such as the dawsonite shown at 104, the resulting aqueous solution may be pumped to the surface via recovery well 210 as shown in FIG. 2. In this type of operation, when a mineral is to be recovered from an oil shale formation, mineral extraction or solubility rate will usually be higher in a formation after it has been retorted, as in chimney 20, rather than in an unretorted zone such as chimney 10.

If it is found that production of oil from an active chimney will take longer than it will take for all the available upstream reservoirs to become filled with water, additional storage capacity for water can be created upstream by detonating a larger nuclear device at a greater depth between some of the previously formed chimneys, e.g., by placing and detonating a large thermonuclear device at point 222 between chimneys 10 and 20. If this is done, the resulting large chimney can then serve as a reservoir for the accumulation of more subterranean water while a similar deep chimney is created further downstream, for instance, by detonation of a large nuclear device at location 232, such that the large downstream chimney created by detonation 232 can be worked and oil retorted or otherwise recovered therefrom while the chimney created by detonation 222 fills up with water. In other words, nuclear detonations and product recovery therefrom can be operated in a mineral formation in a geometrical pattern and/or in a time sequence such as that illustrated by FIG. 4 in my aforesaid copending application Ser. No. 681,146.

FIG. 3 is a horizontal section through a formation such as that illustrated in FIGS. 1 and 2 but employing a more extensive scheme of detonations. More particularly, where FIGS. 1 and 2 illustrate the detonation of a single row of chimneys in a direction proceeding downstream along an aquifer, FIG. 3 shows four such rows side-by-side, chimneys 10-20-30 forming a first row, chimneys 310-320-330 forming a second row, chimneys 810-820-830 forming a third row, chimneys 910-920-930 forming a fourth row, etc. In such a case, when an aquifer 109 flows through the formation in a direction generally represented by arrows A, the top set of detonations 10, 310, 810 and 910 serve as an initial reservoir while chimneys 20, 320, 820 and 920 are producing. Similarly, when product has been depleted from chimneys 20, 320, 820 and 920, these chimneys will serve to collect water while the next chimney or set of chimneys downstream is in production. And again, when chimneys are thereafter created by detonations at locations 222 and 322 to catch the water, chimneys created downstream by detonations at locations 232 and 332 can effectively worked.

EXAMPLE 2

FIG. 4 illustrates a different embodiment wherein the invention is used to facilitate the recovery of oil or gas where the desired hydrocarbons are originally trapped under water in an arching formation in an anticlinal situation.

More particularly, referring to FIG. 4, 401 shows the earth's surface, 402 is a geological contact showing an arching formation in an anticlinal situation, 404 is a pool of water trapped in an anticlinal structure, 405 is natural gas trapped in an anticlinal structure deeper in the same formation, and 406 is water trapped under the gas in this formation. To facilitate gas recovery in such a situation, an access well is drilled as shown at 403 to a depth indicated by point 407, a nuclear explosive device (of a yield which can be safely detonated at this depth without venting to the atmosphere) is placed at the bottom of the well and detonated after the well is sealed, thereby creating a chimney 410, containing nuclearly detonated rubble. As this chimney is formed, the water present in the formation drains down toward the bottom while the gas rises to the top of the chimney whence it can be pumped out either by redrilling the original access well 403 or by sinking a new recovery well (not shown).

While the invention has been described above principally in connection with the recovery of hydrocarbons from underground formations, and more particularly in connection with the recovery of shale oil by in situ retorting and in connection with the recovery of natural gas from nuclearly detonated underground chimneys, the broad principles of the invention have much wider applicability. For instance, the purposeful information of a large underground reservoir by nuclear detonation may serve to prevent or minimize the flooding of conventional underground coal or copper mines or any other underground producing areas, located downstream from the protective reservoir. Moreover, while in many instances it may be best to create such protective underground reservoir before the exploitation of a productive zone is begun, in other instances the creation of such reservoir may be beneficial after a productive zone such as coal mines has been worked to a substantial extent. In this way, the life of a partially flooded mine may be substantially extended or the productive life of a fully flooded mine may be restored without the need to rely on mechanical pumps.

The subject matter of the invention is particularly pointed out in the appended claims.

I claim:

1. An improved process for recovering mineral product from a subterranean working area in a geological formation wherein a source of subterranean water is located at a place laterally spaced from said working area and is predisposed to drain into said working area, which process comprises forming an underground nuclear chimney in said formation by placing and detonating a nuclear explosive under substantially nonventing conditions in said formation between said working area and said source of water such that water present in said formation drains off into said nuclear chimney and the working area is relatively free from water, and recovering mineral product from said working area while said nuclear chimney is filling with water.

2. A process according to claim 1 wherein said subterranean working area is a coal mine in the vicinity of subterranean water.

3. A process according to claim 1 wherein said subterranean working area is a metalliferous ore mine.

4. A process according to claim 1 wherein a nuclear explosive is detonated in proximity to a previously flooded mine such that water is drained from said mine into the nuclear chimney, thereby extending the productive life of said mine.

5. A process according to claim 1 wherein subterranean water and fluid hydrocarbons are trapped in a mineral formation.

6. a process according to claim 1 wherein a subterranean aquifer traverses an underground mineral formation on top of a substantially impermeable bed and wherein a nuclear explosive device is detonated in said formation under nonventing conditions creating a chimney of permeable rubble upstream on the aquifer relative to a productive area where product is to be recovered, the yield and location of said device being such that its detonation fractures said impermeable aquifer bed and provides a reservoir for the water to collect in while recovery of substantially water insoluble product is in progress downstream therefrom.

7. A process according to claim 6 wherein a second nuclear detonation is set off under nonventing conditions to create a second chimney of permeable rubble downstream from said first mentioned chimney and product is recovered from said second chimney.

8. A process according to claim 6 wherein said first chimney has a permeability such that voids constitute about 25 to 40 percent of its volume.

9. A process according to claim 8 wherein the formation is an oil shale formation and shale oil is recovered from the second chimney therein by underground combustion and retorting.

10. A process according to claim 8 wherein upon filling of said first chimney with water the latter overflows into the second chimney from which water insoluble product has been depleted by the application of heat, and the water leaches out water soluble product mineral from the treated rubble in said second chimney and the resulting aqueous solution is recovered therefrom.

11. A process according to claim 10 wherein said soluble mineral is dawsonite.

12. A process according to claim 8 wherein a plurality of nuclear devices are set off in a laterally spaced relationship in a line which is substantially perpendicular to the direction of flow of the aquifer thereby substantially completely blocking the water from a productive area located downstream from said line.

13. A process according to claim 12 wherein the plurality of nuclear devices is so spaced one from the other that the formation therebetween is broken and made permeable.

14. In a process for recovering oil from an oil shale formation which is blasted and fractured by underground detonation of a nuclear explosive device and retorted in situ in a productive chimney formed by said detonation, and which formation contains a subterranean aquifer having a substantially impermeable bed extending through a portion of said formation which is fractured by said detonation, the improvement which comprises fracturing the said impermeable bed and creating an upstream chimney containing broken rock by setting off another underground nuclear detonation in said formation, said other nuclearly detonated chimney being located upstream on the aquifer from said productive chimney, thereby diverting water from the aquifer into said upstream chimney while retorting is in progress in said productive chimney.

15. A process according to claim 14 wherein a plurality of productive chimneys is nuclearly detonated in sequence downstream from the said upstream chimney leaving substantially unfractured formation therebetween, said downstream chimneys being kept substantially free of water during the progress of retorting therein as the water collects in a chimney upstream therefrom.

16. A process according to claim 15 wherein several sequences of chimneys are detonated downstream along the aquifer, the chimneys of a later detonated sequence extending to a greater depth than and being located between chimneys of a prior detonated sequence while avoiding the creation of permeability between chimneys which are being retorted and chimneys which are collecting water.

17. A process according to claim 15 wherein a plurality of chimneys for the diversion and collection of water is nuclearly detonated side-by-side across the aquifer upstream from the productive chimneys and prior to the formation of said productive chimneys, and wherein the productive chimneys are detonated in said formation in a pattern wherein they are spaced from each other both in a downstream direction and in a transverse direction relative to the flow of the aquifer.